(12) United States Patent
Chiba

(10) Patent No.: US 7,520,132 B2
(45) Date of Patent: Apr. 21, 2009

(54) CUP SEAL AND MASTER CYLINDER EMPLOYING THE SAME

(75) Inventor: Shusaku Chiba, Higashimatsuyama (JP)

(73) Assignee: Bosch Corporation, Tokyo (JP)

( * ) Notice: Subject to any disclaimer, the term of this patent is extended or adjusted under 35 U.S.C. 154(b) by 266 days.

(21) Appl. No.: 10/582,212

(22) PCT Filed: Mar. 22, 2005

(86) PCT No.: PCT/JP2005/005654

§ 371 (c)(1),
(2), (4) Date: Jun. 8, 2006

(87) PCT Pub. No.: WO2005/090837

PCT Pub. Date: Sep. 29, 2005

(65) Prior Publication Data

US 2007/0157613 A1    Jul. 12, 2007

(30) Foreign Application Priority Data

Mar. 23, 2004    (JP) ............................. 2004-084963

(51) Int. Cl.
B60T 11/228 (2006.01)
(52) U.S. Cl. ..................................... 60/588
(58) Field of Classification Search ................... 60/588; 277/465
See application file for complete search history.

(56) References Cited

U.S. PATENT DOCUMENTS 3,271,038 A * 9/1966 Bastow ....................... 277/562
4,249,381 A * 2/1981 Gaiser ......................... 60/589
6,272,858 B1 * 8/2001 Takano et al. ................. 60/588

FOREIGN PATENT DOCUMENTS

| JP | 53-104076 | 9/1978 |
| JP | 58-149608 | 10/1983 |
| JP | 05-58540 | 8/1993 |
| JP | 2003-063378 | 3/2003 |

* cited by examiner

Primary Examiner—F. Daniel Lopez
(74) Attorney, Agent, or Firm—Manabu Kanesaka

(57) ABSTRACT

In a cup seal of the present invention, an inner lip (27b) is pressed into close contact with a piston (9) and an outer lip (27c) is pressed into close contact with a bottom wall (26a) of a concavity (26) by fluid pressure developed in a fluid pressure chamber (11) when the piston (9) moves forward. Therefore, fluid pressure is sealed. When the piston (9) is retracted, the outer lip (27c) is deflected inwardly and is thus spaced apart from the bottom wall (26a) of the concavity (26). Hydraulic fluid of a reservoir is supplied to the fluid pressure chamber (11) through a first communication path (22), grooves (27e), and the space between the outer lip (27c) and the bottom wall (26a). As mentioned above, the inner lip (27b) has only the sealing function, while the outer lip (27c) has both the sealing function and the pumping function and ensures sufficient fluid supply by the grooves.

6 Claims, 5 Drawing Sheets

(a)

(b)

(a)

(b)

(a)

(b)

US 7,520,132 B2

CUP SEAL AND MASTER CYLINDER EMPLOYING THE SAME

BACKGROUND ART

The present invention relates to technical field of a cup seal to be used in a master cylinder of a brake or a clutch of a vehicle such as an automobile, or the like and to a technical field of a plunger-type master cylinder employing the cup seal.

Conventionally, a master cylinder for developing fluid pressure according to pedaling force on a brake pedal or a clutch pedal is used in a hydraulic brake system or a hydraulic clutch system for the purpose of actuating a brake or a clutch. As such a master cylinder, a plunger-type master cylinder is known from Japanese Unexamined Patent Publication No. 2003-194100, which comprises a cylinder body having a cylinder bore, a piston which is slidably inserted into the cylinder bore and defines a fluid pressure chamber, a communication path which is formed in the cylinder body and communicates with a reservoir, a relief port which is formed in the piston to allow communication between the communication path and the fluid pressure chamber, and a sealing member which is received in a concavity formed in the inner periphery of the cylinder bore of the cylinder body and into which the piston is slidably inserted so as to seal between the inner periphery of the cylinder bore and the outer periphery of the piston.

When the plunger-type master cylinder is inoperative, the communication between the relief port of the piston and the communication path is not isolated by the sealing member so that the fluid pressure chamber communicates with the reservoir via the relief port and the communication path. Therefore, in the inoperative state, the fluid pressure chamber is at atmospheric pressure so that no fluid pressure is developed. As the piston moves forward toward the fluid pressure chamber side by depression of a clutch pedal, the communication between the relief port and the communication path is isolated by the sealing member so that the fluid pressure chamber is isolated from the reservoir. In this manner, according to the forward movement of the piston, fluid pressure is developed in the fluid pressure chamber.

Generally, such a sealing member used in the plunger-type master cylinder is required to have a sealing function for preventing leakage of fluid pressure during development of fluid pressure by the forward movement of the piston and also required to have a pumping function as a fluid supplying function for supplying brake fluid of the reservoir to the fluid pressure chamber for the purpose of improving responsiveness of the piston during the retraction. To impart the both functions to a sealing member, a cup seal is employed as the sealing member. The cup seal is formed to have a laterally-facing U-shaped section and comprises an annular base portion extending radially, an inner lip axially extending from the inner peripheral side end of the base portion, and an outer lip axially extending from the outer peripheral side end of the base portion.

When fluid pressure is developed in the fluid pressure chamber, the inner lip is pressed into close contact with the outer periphery of the piston by the fluid pressure and the outer lip is pressed into close contact with a bottom wall of the concavity, in which the sealing member is received, by the fluid pressure, whereby the sealing member fluid-tightly seals between the outer periphery of the piston and the inner periphery of the cylinder bore.

Since the volume of the fluid pressure chamber is increased when the piston is retracted after development of the fluid pressure, the pressure in the fluid pressure chamber is reduced and tends to be negative pressure. Accordingly, the inner lip is deflected outwards apart form the outer periphery of the piston so as to form a space therebetween and the outer lip is deflected inwards apart from the bottom wall of the concavity so as to form a space therebetween. Through these spaces, brake fluid of the reservoir is supplied to the fluid pressure chamber so that the piston can be smoothly and rapidly retracted.

By the way, in the master cylinder disclosed in Japanese Unexamined Patent Publication No. 2003-194100, the thickness of the inner lip and the thickness of the outer lip are substantially equal. From this, it is considered that the inner lip and the outer lip both have the aforementioned sealing function and the pumping function. However, when the inner lip on which the piston slides has the two functions, the inner lip must be somewhat thin in order to ensure the pumping function of the inner lip. When the inner lip is formed to be thin, however, a problem that the inner lip enters in the relief port, i.e. is caught by the piston, is caused. For this, in the master cylinder disclosed in Japanese Unexamined Patent Publication No. 2003-194100, the inner lip is provided with a tapered surface formed on a side thereof on which the piston slides, thereby preventing the inner lip from being caught by the piston.

When the inner lip is provided with the tapered surface, however, there is a problem that rapid and secure supply of fluid to the fluid pressure chamber when the piston is retracted is impossible, that is, the property of supplying fluid should not be well. Further, the decrease in thickness of the inner lip makes the cap configuration easy to be deformed. Furthermore, since the inner lip has the tapered surface, there is also a problem that the sealing point of the inner lip is erratic.

To solve the problems in case that the both lips have the aforementioned two functions, it is considerable that the inner lip has only the sealing function while the outer lip has both the sealing function and the pumping function. When only the outer lip has the pumping function, however, fluid paths formed in the cylinder body must be complex in structure. Since fluid supply is conducted only by the outer lip, the fluid supply by the outer lip must cover the fluid supply to be originally conducted by the inner lip. Therefore, a larger amount of fluid to be supplied by the outer lip is required, thus making the fluid paths more complex. In addition, the cylinder must be composed of a number of divided parts in order to form such complex fluid paths so that there is a problem of increasing the number of parts.

DISCLOSURE OF THE INVENTION

The present invention has been attained in view of the aforementioned-circumstances, and it is an object of the present invention to provide a cup seal in which an inner lip has only the sealing function and an outer lip has both the sealing function and the pumping function and which can ensure sufficient fluid supply and has simple structure and improved durability.

It is another object of the present invention to provide a master cylinder which can reliably develop fluid pressure and has improved responsiveness of the piston during the retraction.

To achieve the above-mentioned object, a cup seal of the present invention is received in a concavity and comprises an annular base portion which radially extends and through which a slidable member is slidably inserted, an annular inner lip which extends axially from the inner peripheral side end of the base portion and through which the slidable member is slidably inserted, and an annular outer lip which extends axially from the outer peripheral side end of the base portion and is in contact with a bottom wall of said concavity such that the outer lip can be spaced apart from the bottom wall, wherein the cup seal is formed to have a laterally-facing U-shaped section, and is characterized in that base side fluid passage grooves are formed in said base portion to radially extend to allow communication between the outer peripheral side and the inner peripheral side of said base portion.

Further, the cup seal of the present invention is characterized in that said base side fluid passage grooves are designed to have such a width not to collapse said base side fluid passage grooves when hydraulic fluid flows through said base side fluid passage grooves.

Further, the cup seal of the present invention is characterized in that lip side fluid passage grooves are formed in said inner lip to radially extend and to open the front end of said inner lip.

Furthermore, the cup seal of the present invention is characterized in that said inner lip is formed to be thicker than that of said outer lip.

A master cylinder of the present invention comprises a cylinder body having a cylinder bore, a piston which is slidably inserted into said cylinder bore and defines a fluid pressure chamber, a communication path which is formed in said cylinder body and communicates with a reservoir, a relief port which is formed in said piston, always communicates with said fluid pressure chamber, and allows communication between said communication path and said fluid pressure chamber, and a sealing member which is received in a concavity formed in the inner periphery of the cylinder bore of said cylinder body and into which the piston is slidably inserted so as to seal between the inner peripheral surface of said cylinder bore and the outer peripheral surface of said piston, wherein communication between said communication path and said relief port is allowed when the master cylinder is inoperative, and the communication between said communication path and said relief port is isolated by movement of said piston when the master cylinder is operative, and is characterized in that said sealing member is composed of a cup seal as claimed in any one of the first aspect through the forth aspect, and said base side fluid passage grooves communicate with said communication path.

Further, the master cylinder of the present invention is characterized in that a space allowing communication between said relief port and said communication path via said base side fluid passage grooves when the master cylinder is inoperative is formed between said cup seal and said relief port.

According to the cup seal of the present invention, the base side grooves are formed in the base portion. Therefore, when the piston tends to rapidly return to the inoperative state from the operative state, negative pressure tends to be developed in the fluid pressure chamber so that hydraulic fluid flows through the base side grooves during supply of the hydraulic fluid, whereby a required amount of hydraulic fluid can be reliably and sufficiently supplied, thereby improving the property of supplying fluid of the cup seal.

According to the cup seal of the present invention, the base side fluid passage grooves are designed to have such a width not to collapse the base side fluid passage grooves when hydraulic fluid flows through the base side fluid passage grooves, thereby ensuring the flow of hydraulic fluid through the base side groove and thus further improving the property of supplying fluid of the cup seal.

According to the cup seal of the present invention, the lip side fluid passage grooves are formed in the inner lip so that the hydraulic fluid flowed through the base side grooves when the supply of hydraulic fluid flows through the lip side fluid passage grooves, thereby further improving the property of supplying fluid of the cup seal.

Further according to the cup seal of the present invention, the inner lip is formed to be thicker than the outer lip, that is, the inner lip into which the slidable member is slidably inserted is thick so that the inner lip is endowed only with the sealing function, while the outer lip is thin so as to allow the outer lip to be easily deflected and allow the hydraulic fluid to be easily sucked so that the outer lip is endowed both with the sealing function and the pumping function. Therefore, the cup seal is prevented from being caught by the slidable member, thereby improving the durability of the cup seal. According to the cup seal of the invention as claimed in the forth aspect, the sealing function, the fluid supplying function, and fluid self-feeding function can be effectively exhibited with a simple structure without changing significantly the design of a conventional cup seal, just by forming grooves having a simple shape for allowing the flow of hydraulic fluid and designing the inner lip and the outer lip such that the inner lip is thicker than the outer lip.

According to the master cylinder of the present invention, in operation, the inner lip is pressed into close contact with the outer peripheral surface of the primary piston and the outer lip is pressed into close contact with the bottom wall of the concavity by the fluid pressure developed in the fluid pressure chamber, whereby reliable sealing action is obtained, thereby improving the sealing performance by the cup seal.

When negative pressure tends to be developed in the fluid pressure chamber during retraction of the piston according to cancellation of the pedaling operation, the hydraulic fluid of the reservoir can be supplied to the fluid pressure chamber through the base side grooves formed in the base portion by the pumping function of the outer lip so that the backward movement of the piston can be smoothly and rapidly conducted. Since the lip side grooves are formed in the inner lip and the base side grooves are formed in the base portion of the cup seal, the hydraulic fluid of the reservoir can be further reliably and sufficiently supplied to the fluid pressure chamber. Therefore, the property of supplying fluid of the cup seal is improved and the responsiveness of the piston during the retraction is thus improved.

Furthermore, the space formed between the end of the relief port of the piston in its inoperative position and the end of the cup seal is set to have a predetermined size and the inner lip is formed to be thick. For example, in case that the master cylinder of the present invention is adopted to a brake system provided with an automatic braking, the inner lip is prevented from being deflected and the space is prevented from being reduced when hydraulic fluid is sucked to the fluid pressure chamber side by actuation of the automatic braking. Therefore, for example when the automatic braking is actuated in wheel cylinders which are operated with the fluid pressure of the master cylinder, hydraulic fluid of the reservoir can be reliably supplied to the wheel cylinders via the fluid pressure chamber of the master cylinder. This improves the fluid self-feeding property of supplying hydraulic fluid from the reservoir to the wheel cylinders via the fluid pressure chamber during actuation of the automatic braking.

Since the master cylinder of the present invention has the space allowing communication between the relief port and the communication path via the base side fluid passage grooves when the master cylinder is inoperative, the communication path is prevented from being closed by the cup seal being caught by the communication path due to fluid pressure developed in the pressure chamber of the master cylinder, for example, when the automatic braking is cancelled or an antilock braking control is cancelled. Therefore, the flow of brake fluid is never blocked at the communication path.

BRIEF DESCRIPTION OF THE DRAWINGS

FIGS. 1(a), 1(b) show an example of plunger-type master cylinder to which an embodiment of the cup seal according to the present invention is adopted, wherein FIG. 1(a) is a longitudinal sectional view and FIG. 1(b) is a partially enlarged sectional view of FIG. 1(a);

FIGS. 2(a)-2(c) show an embodiment of a cup seal according to the present invention, used in the master cylinder shown in FIGS. 1(a), 1(b), wherein FIG. 2(a) is a sectional view taken along a line IIA-IIA of FIG. 2(b), FIG. 2(b) is a partial right-side view, and FIG. 2(c) is a partial plan view, FIGS. 3(a), 3(b) are illustrations for explaining the action of a sealing member of the master cylinder shown in FIG. 1(b), wherein FIG. 3(a) is an illustration for explaining the state that a primary piston moves forward and FIG. 3(b) is an illustration for explaining the state that the primary piston is retracted, FIGS. 5(a), 5(b) are illustrations for explaining the action of a sealing member of the master cylinder shown in FIG. 4, wherein FIG. 5(a) is an illustration for explaining the state that a primary piston is inoperative and FIG. 5(b) is an illustration for explaining the state that the primary piston is retracted.

BEST MODE FOR CARRYING OUT THE INVENTION

Figure 1:
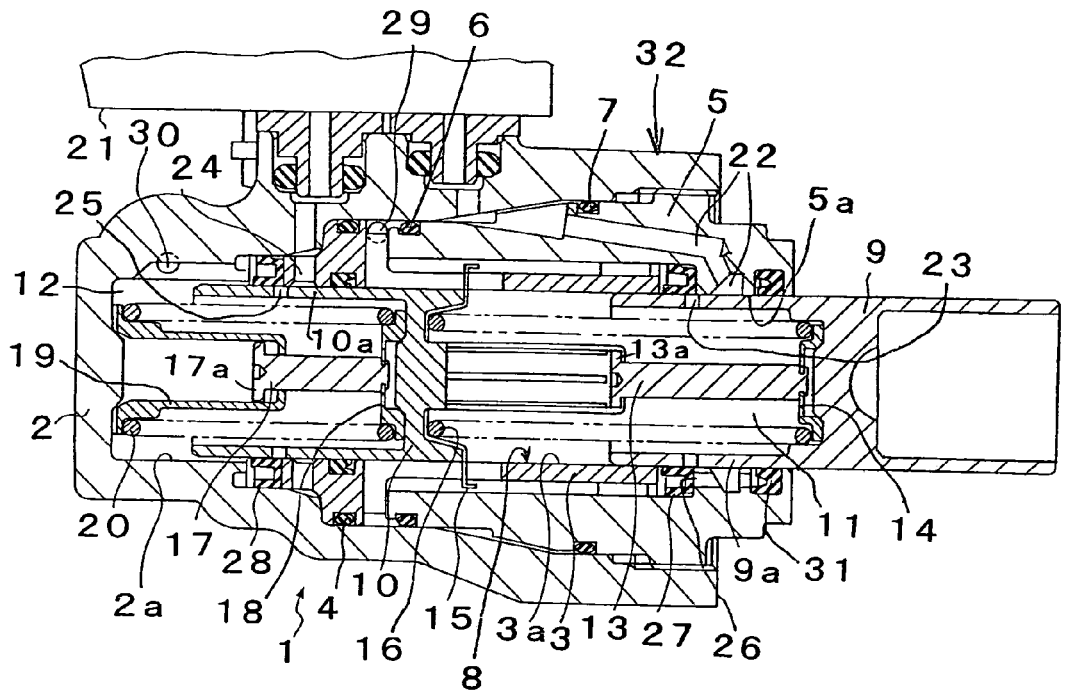
Figure 1:
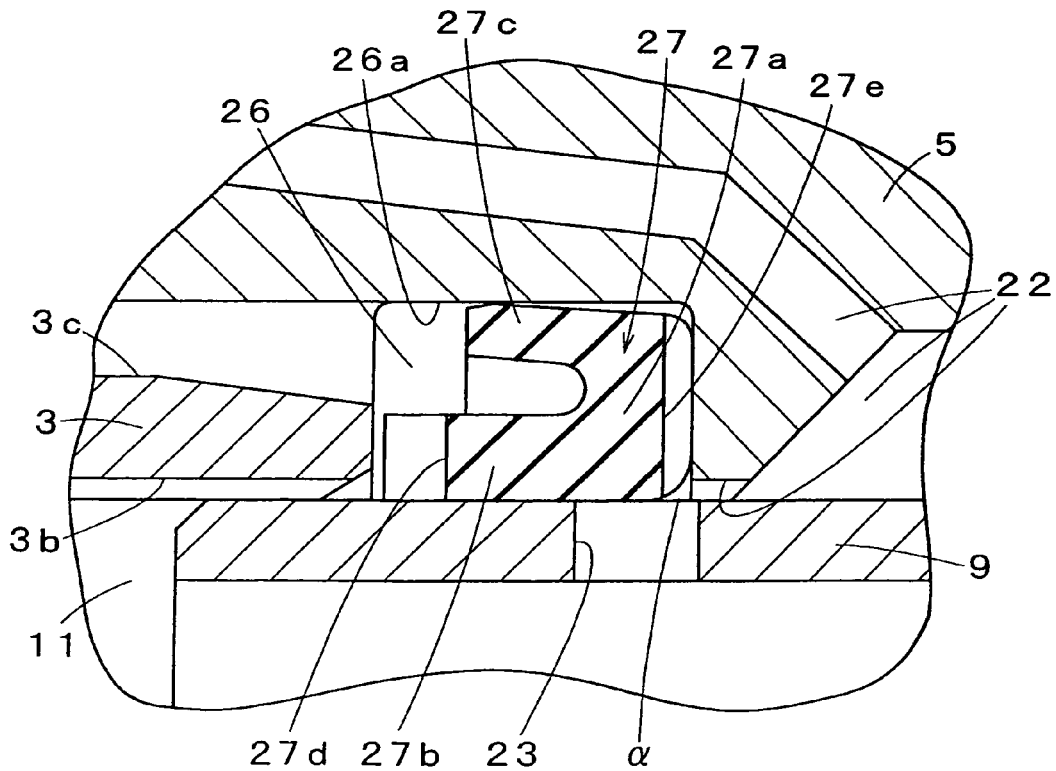

Hereinafter, embodiments of the present invention will be described with reference to the attached drawings.

FIGS. 1(a), 1(b) show an example of plunger-type master cylinder to which an embodiment of the cup seal according to the present invention is adopted, wherein FIG. 1(a) is a longitudinal sectional view and FIG. 1(b) is a partially enlarged sectional view of FIG. 1(a). In the following description, the terms such as "front or fore" and "rear or back" refer to the left and the right, respectively, in the drawings.

As shown in FIGS. 1(a) and 1(b), the plunger-type master cylinder 1 is provided with a first cylinder member 2. In the first cylinder member 2, a sleeve 3 is fitted fluid-tightly to the inner surface of the first cylinder member 2 by a sealing member 4 and a second cylinder member 5 is fitted fluid-tightly to the inner surface of the first cylinder member 2 by sealing members 6, 7 and is threadably fixed to the first cylinder member 2. Therefore, the sleeve 3 is caught between the first cylinder member 2 and the second cylinder member 5 in the axial direction and is thus fixed. The first and second cylinder members 2, 5 cooperate together to compose a cylinder body 32. An axial bore 2a of the first cylinder member 2, an axial bore 3a of the sleeve 3, and an axial bore 5a of the second cylinder member 5 cooperate together to form a cylinder bore 8.

Slidably inserted into the cylinder bore 8 are a primary piston 9 corresponding to a sliding member of the present invention and a secondary piston 10 also corresponding to the sliding member of the present invention. The primary piston 9 moves leftward by a brake pedal or by a brake booster which boosts pedaling force on the brake pedal. By the primary piston 9 and the secondary piston 10, in the cylinder bore 8, a first fluid pressure chamber 11 is defined between the primary piston 9 and the secondary piston 10 and a second fluid pressure chamber 12 is defined between the secondary piston 10 and a bottom 8a of the cylinder bore 8.

In the first fluid pressure chamber 11, a first shaft member 13 is arranged. The first shaft member 13 is provided with a pair of right and left, i.e. first and second retainers 14, 15. The first retainer 14 is fixed to the first shaft member 13 while the second retainer 15 is slidable relative to the first shaft member 13. In this case, when the second retainer 15 comes in contact with the flange 13a, the first and second retainers 14 and 15 are set in a state farthest from each other as shown in FIG. 1(a). A return spring 16 is disposed and compressed between the first and second retainers 14 and 15. The first retainer 14 is always in contact with the primary piston 9 and the second retainer 15 is always in contact with the secondary piston 10. In the inoperative state of the master cylinder 1 as shown in FIG. 1(a), the primary piston 9 and the secondary piston 10 are set in a state farthest from each other.

In the second fluid pressure chamber 12, a second shaft member 17 is arranged. The second shaft member 17 is provided with a pair of right and left, i.e. third and fourth retainers 18, 19. The third retainer 18 is fixed to the right side of the second shaft member 17 while the fourth retainer 19 is slidable relative to the second shaft member 17. In this case, when the forth retainer 19 comes in contact with a flange 17a formed on the left end of the second shaft member 17, the third and fourth retainers 18 and 19 are set in a state farthest from each other as shown in FIG. 1(a). A second return spring 20 is disposed and compressed between the third and fourth retainers 18 and 19. The third retainer 18 is always in contact with the secondary piston 10 and the fourth retainer 19 is always in contact with the bottom 8a of the cylinder bore 8. In the inoperative state of the master cylinder 1, the secondary piston 10 is set in a state farthest from the bottom 8a.

The first cylinder member 2 is provided with a reservoir 21. The reservoir 21 can communicate with the first fluid pressure chamber 11 through a first communication path 22 and a first relief port 23 which is formed in the primary piston 9 and always communicates with the first fluid pressure chamber 11. The first relief port 23 is composed of a radial communication hole which is formed in a left end-side cylindrical portion 9a of the primary piston 9 so as to allow communication between the first fluid pressure chamber 11 inside the primary piston 9 and the first communication path 22 outside the primary piston 9. The reservoir 21 can communicate with a second fluid pressure chamber 12 via a second communication path 24 and a second relief port 25 which is formed in the secondary piston 10. Similarly to the first relief port 23, the second relief port 25 is composed of a radial communication hole which is formed in a cylindrical portion 10a of the secondary piston 10 to allow communication between the second fluid pressure chamber 12 inside the secondary piston 10 and the second communication path 24 outside the secondary piston 10.

Figure 2:
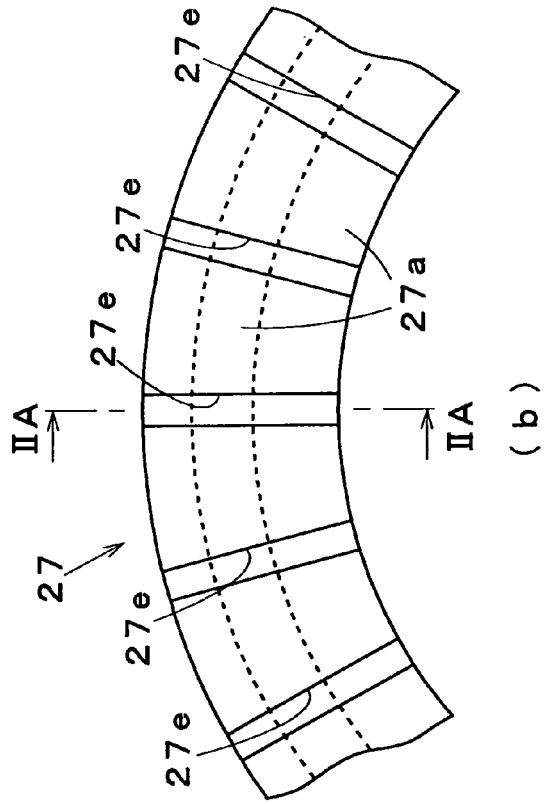
Figure 2:
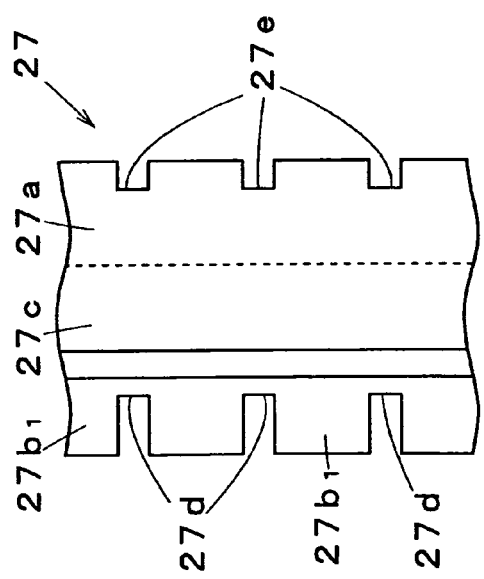
Figure 2:
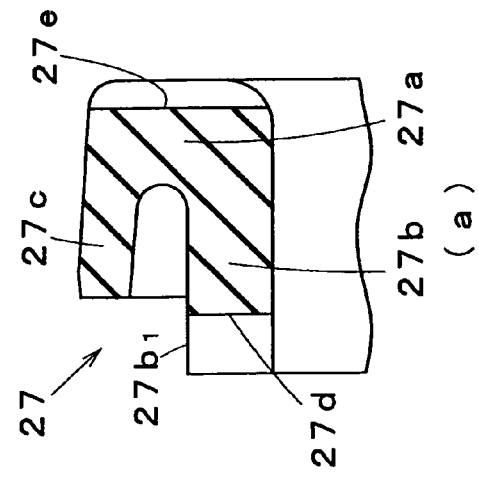

An annular first sealing member 27 composed of a cup seal is received in a concavity 26 between the sleeve 3 in which the primary piston 9 is disposed and the second cylinder member 5 so that the primary piston 9 is fluid-tightly and slidably inserted through the first sealing member 27. As shown in FIGS. 2(a) through 2(c), the annular first sealing member 27 comprises an annular base portion 27a which radially extends and through which the primary piston 9 is slidably inserted, an annular inner lip 27b which extends axially from the inner side end of the base portion 27a and through which the primary piston 9 is slidably inserted, and an annular outer lip 27c which extends axially from the outer side end of the base portion 27a and is in contact with a bottom wall 26a of the concavity 26 such that the outer lip 27c can be spaced apart from the bottom wall 26a. By these components, the annular first sealing member 27 is formed to have a laterally-facing U-shaped section.

The outer lip 27c is formed to be relatively thin. The inner lip 27b has a thickness larger than that of the outer lip 27c and substantially equal to that of the base portion 27a. Therefore, the tip end portion of the outer lip 27c is easily deflected so as to allow easy suction of fluid. The length of the outer lip 27c in the axial direction is shorter than the length of the inner lip 27b so that the inner lip 27b has a portion $27b_1$ which is not overlapped with the outer lip 27c.

The outer lip 27c is formed to be relatively thin. The inner lip 27b has a thickness larger than that of the outer lip 27c and substantially equal to that of the base portion 27a. Therefore, the tip end portion of the outer lip 27c is easily deflected so as to allow easy suction of fluid. The length of the outer lip 27c in the axial direction is shorter than the length of the inner lip 27b so that the inner lop 27b has a portion $27b_1$ which is not overlapped with the outer lop 27c.

In the portion $27b_1$ of the inner lip 27b, a predetermined number of lip side grooves 27d are formed at equal intervals in the circumferential direction. Each lip side groove 27d allows communication between the outer peripheral side and the inner peripheral side of the portion $27b_1$ and opens the front end of the portion $27b_1$. The lip side grooves 27d always communicate with the first fluid pressure chamber 9 via an axial groove 3b formed on the inner peripheral side of the sleeve 3 so as to prevent the concavity 26 from being sealed. In the base portion 27a, a predetermined number of base side grooves 27e are formed at equal intervals in the circumferential direction. Each base side groove 27e allows communication between the outer peripheral side and the inner peripheral side of the base portion 27a and opens the back side of the base portion 27a. The base side grooves 27e always communicate at their inner peripheral sides with the first communication path 22 and the base side grooves 27e always communicate at their outer peripheral sides with the outer peripheral side of the outer lip 27c.

An annular second sealing member 28 composed of a cup seal is received in a concavity (through it is designated with no numeral in FIG. 1, the same numeral 26 as the concavity receiving the first sealing member 27 is used in the following description for the sake of convenience) of the sleeve 3 in which the secondary piston 10 is disposed so that the secondary piston 10 is fluid-tightly and slidably inserted through the second sealing member 28. The second sealing member 28 is formed in completely the same configuration as the cup seal as the first sealing member 27 as shown in FIGS. 2(a) through 2(c). Therefore, detail description of the second sealing member 28 will be omitted.

Though the lip side grooves 27d and the base side grooves 27e are formed at positions corresponding to each other in the axial direction and are designed to have the same width (length in the circumferential direction) in FIGS. 2(a) through 2(c), the lip side grooves 27d and the base side grooves 27e may be freely set independently to have different numbers, different positions, and different widths. The respective grooves 27d, 27e are required to be set to have at least such a width not to collapse the grooves 27d, 27e when the pistons 9, 10 are returned because the grooves 27d, 27e function as passage through which brake fluid flows when the pistons 9, 10 are returned after the actuation of the master cylinder. In this manner, the flow of brake fluid through the base side grooves 27e is ensured, thereby further improving the property of supplying fluid of the first sealing member 27.

The first fluid pressure chamber 11 communicates with a first output port 29 and with wheel cylinders of one of two brake circuits (not shown) via the first output port 29. The second fluid chamber 12 communicates with a second output port 30 and with wheel cylinders of the other one of the two brake circuits (not shown) via the second output port 30.

Numeral 31 designates a third sealing member composed of a cup seal arranged around the inner periphery of the axial bore 5a of the second cylinder member 5. The primary piston 9 is slidably inserted through the third sealing member. The cup seal of the third sealing member is different from the cup seals of the first and second sealing members 27, 28 and is a conventionally known cup seal to ensure fluid tightness between the inner periphery of the axial bore 5a of the second cylinder member 5 and the outer periphery of the primary piston 9.

Hereinafter, action of the master cylinder 1 of this embodiment having the aforementioned structure will be described.

When the brake is in inoperative state shown in FIGS. 1(a) and 1(b), the primary piston 9 and the secondary piston 10 are set in the inoperative positions shown in FIG. 1(a). In the inoperative positions, the pistons 9, 10 are at the right-most positions. As shown in FIG. 1(b), at the right-most position of the primary piston 9, a portion of a right side of the first relief port 23 is positioned on the right side of the right end of the base portion 27a of the first sealing member 27 so as to form a predetermined space α. By the space α, the first relief port 23 and the first communication path 22 communicate with each other via the base side grooves 27e. Therefore, the first fluid pressure chamber 11 communicates with the reservoir 21 so that no fluid pressure is developed in the first fluid pressure chamber 11, that is the first fluid pressure chamber 11 is at atmospheric pressure. Similarly, at the right-most position of the secondary piston 10, the second fluid pressure chamber 12 communicates with the reservoir 21 so that no fluid pressure is developed in the second fluid pressure chamber 12, that is the second fluid pressure chamber 12 is at atmospheric pressure.

Figure 3:
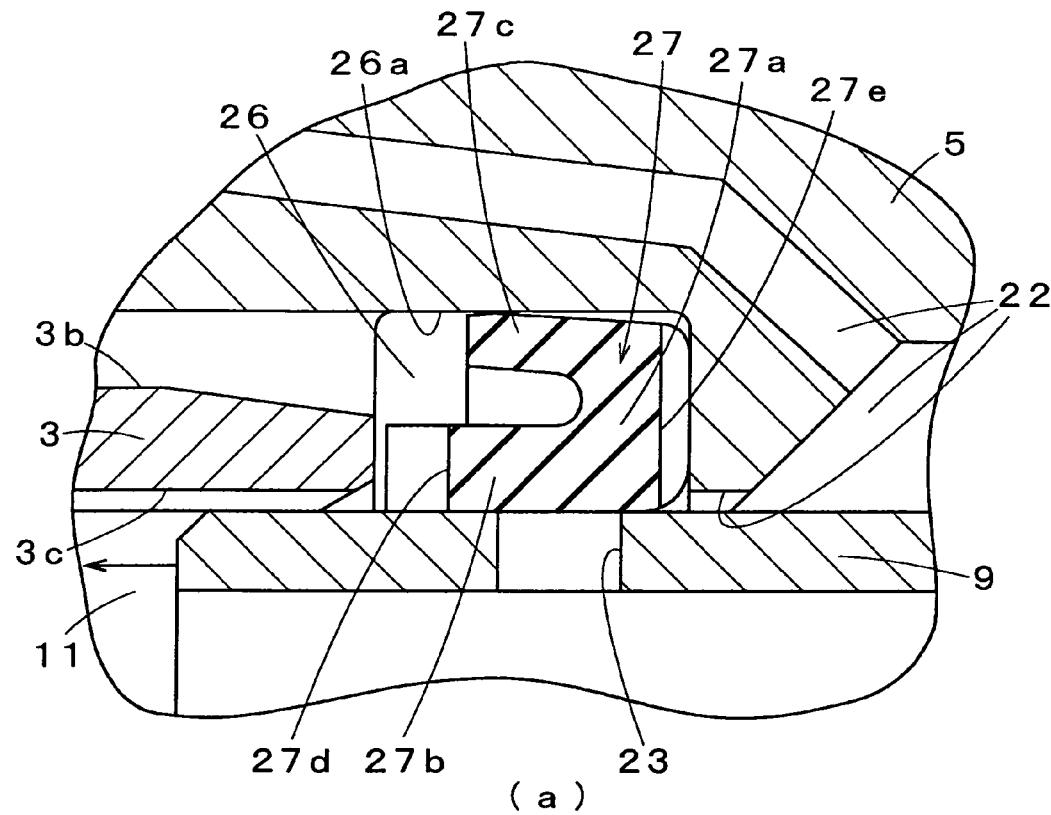
Figure 3:
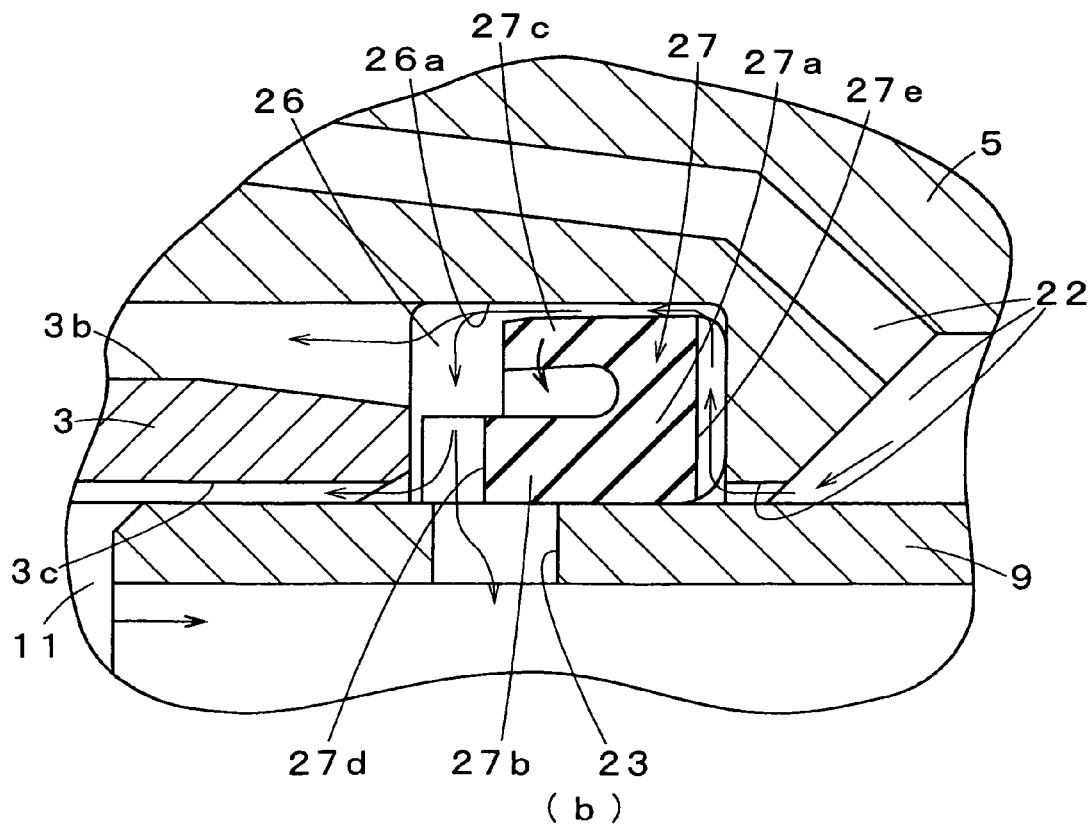

As the primary piston 9 moves forward by depression of the brake pedal, the first relief port 23 is entirely closed by the base portion 27a and the inner lip 27b of the first sealing member 27 as shown in FIG. 3(a). Therefore, the first relief port 23 and the first communication path 22 are isolated from each other so that the first fluid pressure chamber 11 is isolated from the reservoir 21 so as to develop fluid pressure corresponding to the pedaling force. By the pedaling force transmitted via the first return spring 16 by the forward movement of the primary piston 9, the secondary piston 10 moves forward. Accordingly, the second fluid pressure chamber 12 is isolated from the reservoir 21 so that fluid pressure is developed in the second fluid pressure chamber 12.

By the fluid pressure in the first fluid pressure chamber 11, the inner lip 27b of the first sealing member 27 is pressed into close contact with the outer periphery of the primary piston 9 and the outer lip 27c of the first sealing member 27 is pressed into close contact with the bottom wall 26a of the concavity 26 receiving the first sealing member 27. Therefore, the first fluid pressure chamber 11 is sealed from the reservoir 21, thereby preventing fluid pressure of the first fluid pressure chamber 11 from leaking to the reservoir 21. As the primary piston 9 further moves forward, the fluid pressure in the first fluid pressure chamber 11 is increased. Accordingly, the fluid pressure of the first fluid pressure chamber 11 is supplied through the first output port 29 to the wheel cylinders of the one brake circuit, thereby actuating the brake of the one brake circuit.

Similarly, the second fluid pressure chamber 12 is sealed from the reservoir 21 by the second sealing member 28, thereby preventing fluid pressure of the second fluid pressure chamber 12 from leaking to the reservoir 21. As the secondary piston 10 further moves forward, the fluid pressure in the second fluid pressure chamber 12 is increased. Accordingly, the fluid pressure of the second fluid pressure chamber 12 is supplied through the second output port 30 to the wheel cylinders of the other brake circuit, thereby actuating the brake of the other brake circuit.

As the depression on the brake pedal is released from the state that the brakes are actuated, the primary piston 9 is retracted by the biasing force of the first return spring 16 such that the primary piston 9 tends to return to the inoperative position. Accordingly, the fluid pressure in the first fluid pressure chamber 11 is reduced so that slight negative pressure is instantaneously developed. Since the outer peripheral side of the outer lip 27c communicates with the reservoir 21 and is thus at atmospheric pressure, the end portion of the outer lip 27c is deflected inwardly as shown in FIG. 3(b) so as to form a space between the bottom wall 26a of the concavity 26 and the outer periphery of the outer lip 27c. Therefore, brake fluid as hydraulic fluid of the reservoir 21 flows into the left side of the first sealing member 27 through the first communication path 22, the base side grooves 27e, and the space between the bottom wall 26a and the outer lip 27c. Further, a part of the brake fluid flows into the first fluid pressure chamber 11 through an axial groove 3c on the outer peripheral side of the sleeve 3 and the other part of the brake fluid flows into the first fluid pressure chamber 11 through the lip side grooves 27d of the inner lip 27, the axial groove 3b on the inner peripheral side of the sleeve 3, and the first relief port 23. Thus, the brake fluid from the reservoir 21 is reliably supplied to the first fluid pressure chamber 11 so that the first fluid pressure chamber 11 becomes at atmospheric pressure. The primary piston 9 is smoothly and rapidly retracted by the biasing force of the first return spring 16, thereby reducing the fluid pressure in the first fluid pressure chamber 11.

By the retraction of the primary piston 9 and the reduction in fluid pressure of the first fluid pressure chamber 11, the secondary piston 10 tends to be retracted by the biasing force of the second return spring 20. Similarly to the first fluid pressure chamber 11, brake fluid of the reservoir 21 is supplied to the second fluid pressure chamber 12. Therefore, the secondary piston 10 is also smoothly and rapidly retracted, thereby reducing the fluid pressure in the second fluid pressure chamber 12.

As the primary piston 9 is retracted and a part of the right side portion of the first relief port 23 is thus positioned on the right side of the right end of the base portion 27a of the first sealing member 27 as shown in FIG. 1(b), the communication between the first relief port 23 and the first communication path 22 is allowed. Therefore, brake fluid of the first fluid pressure chamber 11 is discharged to the reservoir 21 through the first relief port 23 and the first communication path 22, thereby further reducing the fluid pressure in the first fluid pressure chamber 11. Similarly, as the secondary piston 10 is retracted, the communication between the second relief port 25 and the second communication path 24 is allowed so that the brake fluid of the second fluid pressure chamber 12 is discharged to the reservoir 21 through the second relief port 25 and the second communication path 24, thereby further reducing the fluid pressure in the second fluid pressure chamber 12.

As the pistons 9, 10 both reach the right-most positions as shown in FIG. 1(a), the pistons 9, 10 are stopped, the first and second fluid pressure chambers 11, 12 become at atmospheric pressure, and the master cylinder 1 becomes in the inoperative state, thereby canceling the brake.

On the other hand, by operation of an automatic braking, brake fluid of the reservoir 21 is sucked by a pump (not shown) through the first communication path, a space α between the right side of the first relief port 23 and the right side of the base portion 27a, the first relief port 23, the first fluid pressure chamber 11, and the first output port 29 and is sent to the wheel cylinders of the one brake circuit, while brake fluid of the reservoir 21 is sent to the wheel cylinders of the other brake circuit through the second communication path 24, the second relief port 25, the second fluid pressure chamber 12, and the second output port 30. In this manner, the automatic braking is actuated.

According to the master cylinder 1 of this example, in operation, the inner lip 27b of the first sealing member 27 is pressed into close contact with the outer periphery of the primary piston 9 and the outer lip 27c is pressed into close contact with the bottom wall 26a of the concavity 26 by the fluid pressure developed in the first fluid pressure chamber 11, whereby reliable sealing action by the first sealing member 27 is obtained. Similarly, reliable sealing action by the second sealing member 28 is obtained. The sealing performance by the first and second sealing members 27, 28 is improved.

When the primary piston 9 is retracted by the cancellation, brake fluid in the reservoir 21 is supplied to the first fluid pressure chamber 11 by the pumping function of the outer lip 27c, thereby achieving the smooth and rapid backward movement of the primary piston 9. Particularly in the master cylinder 1 of this example, since the lip side grooves 27d are formed in the portion $27b_1$ of the inner lip 27b of the cup seal as the first sealing member 27 and the base side grooves 27e are formed in the base portion 27a, a required amount of brake fluid can be further reliably and sufficiently supplied from the reservoir 21 to the first fluid pressure chamber 11. Similarly, when the secondary piston 10 is retracted, brake fluid in the reservoir 21 is supplied to the second fluid pressure chamber 12 by the pumping function of the second sealing member 28, whereby a required amount of brake fluid can be further reliably and sufficiently supplied from the reservoir 21 to the second fluid pressure chamber 12 so as to achieve smooth and rapid backward movement of the secondary piston 10. Therefore, it improves the property of supplying fluid of the first and second sealing members 27, 28 and improves the responsiveness of the pistons 9, 10 during the retraction.

Since the inner lip 27b of the first sealing member 27 is formed to be thick, the inner lip 27 is endowed only with the sealing function. Since the outer lip 27c which is in contact with the bottom wall 26a of the non-slidable concavity 26 such that the outer lip 27c can be spaced apart from the bottom wall 26a is formed to be thin, the outer lip 27c is endowed both with the sealing function and the pumping function. Similarly, the inner lip of the second sealing member 28 is endowed only with the sealing function and the outer lip of the second sealing member 28 is endowed both with the sealing function and the pumping function. Therefore, the first and second sealing members 27, 28 are prevented from being caught by the pistons 9, 10, respectively, thereby improving the durability of the sealing members 27, 28. Since the outer lips of the first and second sealing members 27, 28 are formed to be thin, the sealing function and the pumping function of the respective outer lips can be effectively exhibited.

According to the first sealing member 27 of this example, as mentioned above, the sealing function, the fluid supplying function, and fluid self-feeding function can be effectively exhibited with a simple structure without changing significantly the design of a conventional cup seal, just by forming grooves 27d, 27e having a simple shape for allowing the flow of hydraulic fluid. Also according to the second sealing member 28, these functions can be effectively exhibited with a simple structure without changing significantly the design of a conventional cup seal.

By the spaces formed between the ends of the first and the second relief ports 23, 25 of the both pistons 9, 10 and the ends of the first and second sealing members 27, 28 in the inoperative positions, the communications between the first and second sealing members 27, 28 and the communication paths 22, 27 are allowed via the base side grooves, respectively, when the master cylinder 1 is inoperative. Therefore, the communication paths 22, 24 are prevented from being closed by the first and second sealing members 28 being caught by the first and second communication paths 22, 24 due to fluid pressure developed in the first and second fluid pressure chambers 11, 12 of the master cylinder 1, for example, when the automatic braking is cancelled or an antilock braking control is cancelled. Therefore, the flow of brake fluid is never blocked at the first and second communication paths 22, 24.

Therefore, the brake fluid of the reservoir 21 can be reliably sucked when the automatic braking is actuated, while the brake fluid can be reliably discharged from the first and second fluid pressure chambers 11, 12 to the reservoir 21 when the automatic braking is canceled. Similarly, also when the antilock braking control is cancelled, the brake fluid can be reliably discharged from the first and second fluid pressure chambers 11, 12 to the reservoir 21. Since the inner lips of the first and second sealing members 27, 28 are formed to be thick, the aforementioned spaces α are prevented from being reduced by deflection of the inner lips when the brake fluid is sucked. Therefore, the supply and discharge of the brake fluid relative to the reservoir 21 can be reliably conducted during the automatic braking or the antilock braking control, thereby improving the fluid self-feeding property.

Figure 4:
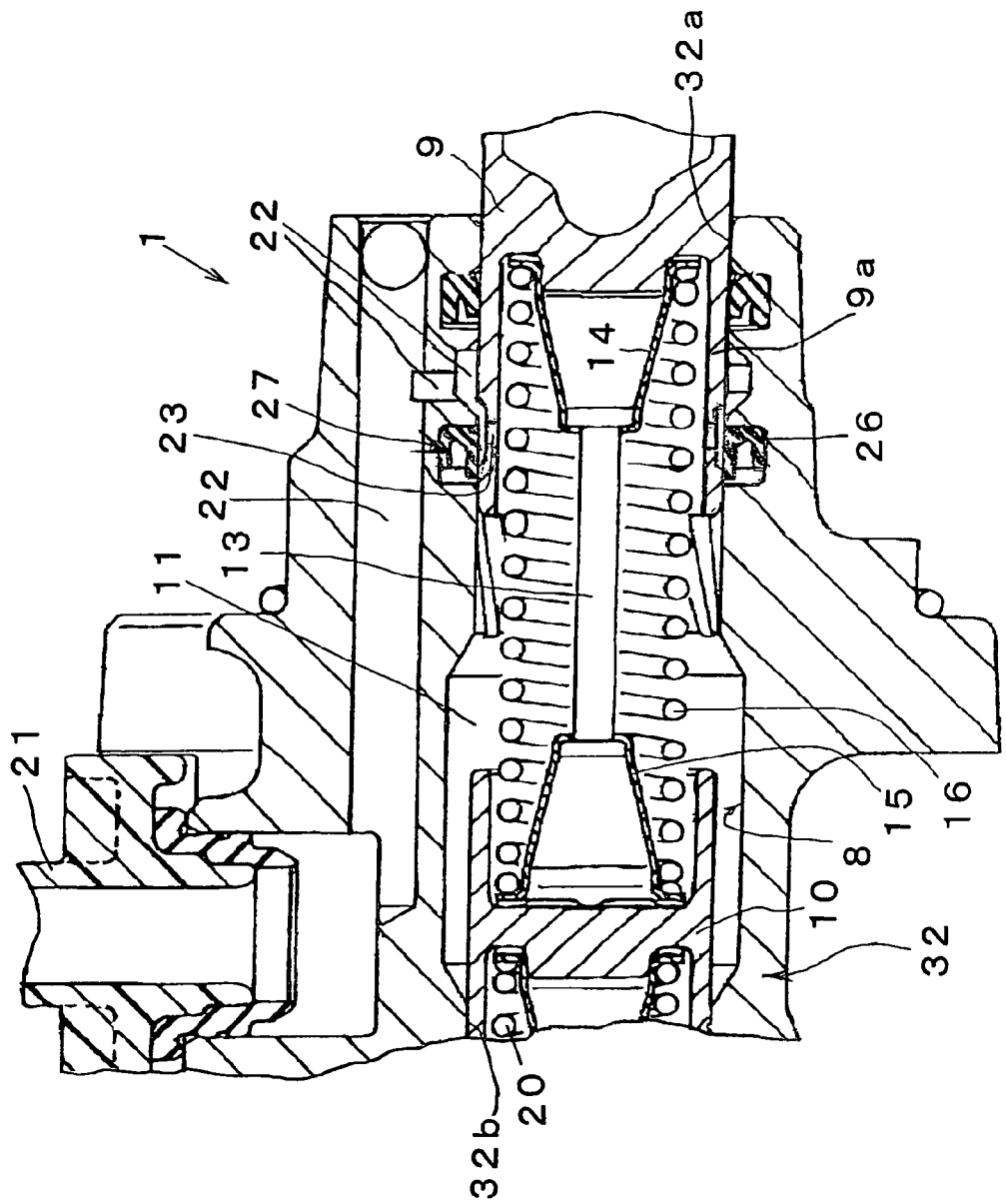
FIG. 4 is a partial longitudinal sectional view showing a part of another example of plunger-type master cylinder to which an embodiment of the cup seal according to the present invention is adopted.

FIG. 4 is a partial longitudinal sectional view showing a part of another example of plunger-type master cylinder to which an embodiment of the cup seal according to the present invention is adopted. The same components as the above-mentioned components will be designated with the same numerals so that detail description about these will be omitted.

Though the cylinder body 32 is composed of the first cylinder member 2 and the second cylinder member 5 and has the sleeve 3 caught between the cylinder members 2 and 5 in the aforementioned plunger-type master cylinder 1 of the example shown in FIG. 1, the master cylinder 1 of this example has a cylinder body 32 composed of a single member and has no sleeve 3 as shown in FIG. 4. Therefore, the master cylinder 1 is provided with no axial grooves 3b, 3c which are, in the example shown in FIG. 1, formed on the inner and outer peripheries of the sleeve 3.

A primary piston 9 and a secondary piston 10 are guided and slidably supported by axial bores 32a, 32b of the cylinder body 32. The axial bores 32a, 32b form a part of a cylinder bore 8.

Figure 5:
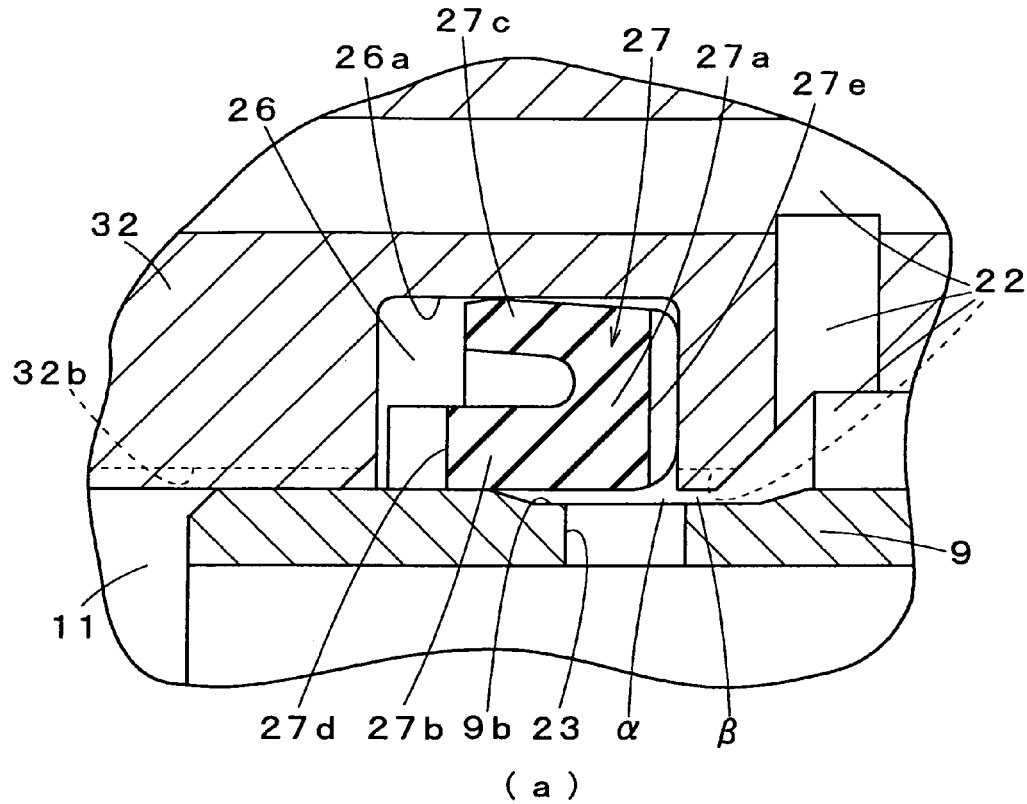
Figure 5:
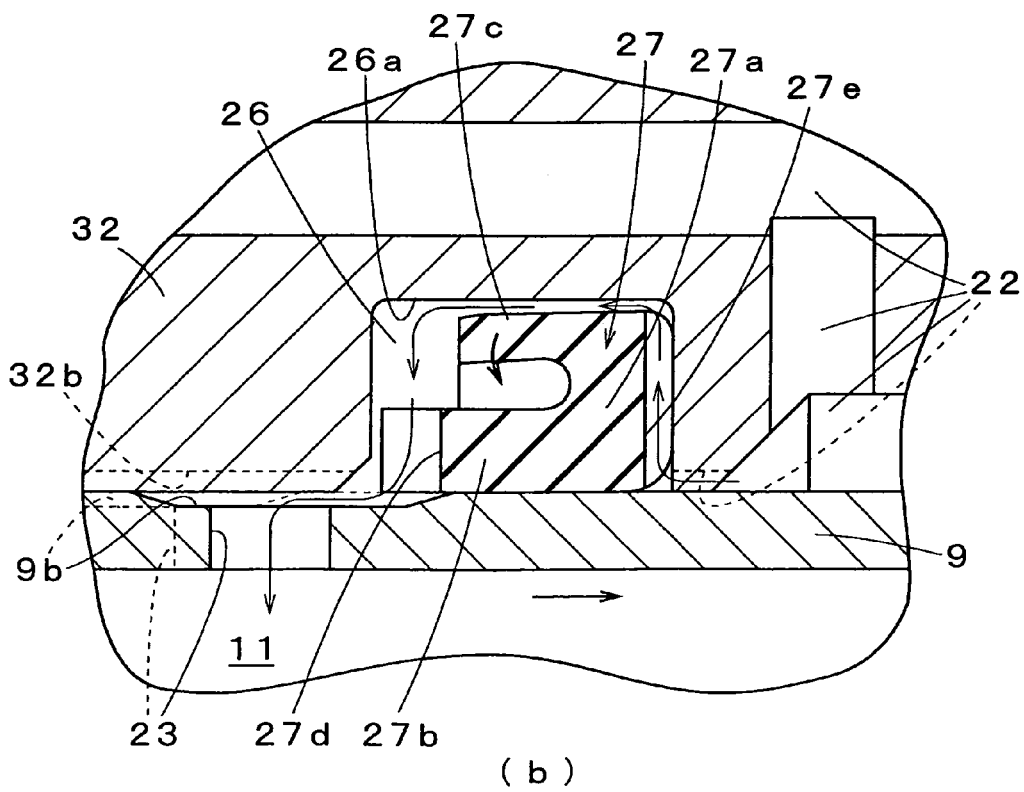

As shown in an enlarged view of FIG. 5(a), the primary piston 9 is provided with an annular concavity 9b formed in its outer periphery where a first relief port 23 is formed. The concavity 9b is designed to form a relatively large space β between the inner periphery of the cylinder body 32 and the primary piston 9 in the inoperative state shown in FIG. 5(a). A part of a first communication path 22 composed of an axial groove is formed in the inner peripheral surface of the cylinder body 32 adjacent to a base portion 27a of the first sealing member 27 so that base side grooves 27e always communicate with the reservoir 21. Further, a second communication path 32b composed of an axial groove is also formed in the inner peripheral surface of the cylinder body 32 adjacent to lip side grooves 27d of an inner lip 27b of the first sealing member 27 so that a concavity 26 receiving the first sealing member 27 always communicates with the first fluid pressure chamber 11. It should be noted that instead of the axial groove of the first communication path 22 and the axial groove of the second communication path 32b formed in the inner peripheral surface of the cylinder body 32, a space may be formed between the inner peripheral surface of the cylinder body 32 and the outer peripheral surface of the primary piston 9. In this case, the space is designed not to damage the guiding function of the primary piston 9 while ensuring the flow rate of brake fluid.

In the master cylinder 1 of this example having the aforementioned structure, when the primary piston 9 tends to rapidly return to the inoperative state after the actuation of the master cylinder 1, brake fluid flows from the reservoir 21 to the left side of the outer lip 27c in the concavity 26 through base side grooves 27e and a space on the outer periphery of the outer lip 27c as shown in FIG. 5(b) similarly to the aforementioned example. Further, the brake fluid is supplied to the first fluid pressure chamber 11 through lip side grooves 27d, the concavity 9b, and the first relief port 23 so that the first fluid pressure chamber 11 becomes at atmospheric pressure. Accordingly, the primary piston 9 can smoothly and rapidly return. When the piston 9 returns from the state that the concavity 9b of the primary piston 9 is entirely positioned to face the inner periphery of the cylinder body 32 on the left side of the concavity 26 receiving the first sealing member 27 as shown by dotted lines in FIG. 5(b), the brake fluid flowed into the left side of the outer lip 27c in the concavity 26 is supplied to the first fluid pressure chamber 11 through the lip side groves 27d, the second communication path 32b, the concavity 9b, and the first relief port 23 and also supplied to the first fluid pressure chamber 11 through the rip side grooves 27d and the second communication path 32b.

The same is true for the secondary piston 10, the second sealing member 28 and the cylinder body 32 provided for the secondary piston 10, but not illustrated.

The other structures, works and effects of the master cylinder 1, the first and second sealing members 27, 28 are the same as those of the aforementioned example.

Though the first sealing member 27 composed of a cup seal is provided with both the lip side grooves 27d and the base side grooves 27e in the aforementioned examples, the present invention is not limited thereto. The sealing member having at least the base side grooves 27e is effective.

The cup seal of the present invention is not limited to a cup seal of a master cylinder of a brake apparatus just like the aforementioned examples and may be adopted to any cup seal which is annular cup seal having a laterally-facing U-shaped section and comprising a base portion, an inner lip on an inner peripheral side end of the base portion, and an outer lip on an outer peripheral side end of the base portion and which is required to have the sealing function and the pumping function.

Further, the master cylinder of the present invention is not limited to a master cylinder of a brake apparatus just like the aforementioned examples and may be adopted to any master cylinder which develops fluid pressure in a fluid pressure chamber by forward movement of a piston, for example a master cylinder of a clutch apparatus. Though a tandem master cylinder in which two pistons are arranged in series is described in the aforementioned examples, the master cylinder of the present invention can be adopted to any master cylinder which is a plunger-type master cylinder, for example a single master cylinder.

INDUSTRIAL APPLICABILITY

The cup seal of the invention is preferably usable as a sealing member for providing seals between a cylinder body and a piston or other sliding member slidably inserted through the cylinder body.

The master cylinder of the invention is preferably usable as a master cylinder adapted to produce a hydraulic pressure in a hydraulic pressure chamber at a forward stroke of the piston and supply a working fluid to the hydraulic pressure chamber at a backward stroke of the piston.

What I claim is:

1. A cup seal received in a concavity and allowing a slidable member to pass therethrough, said cup seal comprising:
   an annular base portion extending radially,
   an annular inner lip extending axially from an inner peripheral side end of the base portion such that the slidable member is slidably inserted through the annular inner lip, and
   an annular outer lip extending axially from an outer peripheral side end of the base portion to contact with a bottom wall of said concavity such that the outer lip can be spaced apart from the bottom wall, wherein the cup seal has a laterally-facing U-shaped section,
   wherein the base portion includes base side fluid passage grooves extending radially to allow communication between an outer peripheral side and an inner peripheral side of said base portion,
   the inner lip includes lip side fluid passage grooves extending radially to completely penetrate therethrough to open at a front end of said inner lip, and
   the annular inner lip is longer than the annular outer lip in an axial direction of the cup seal.

2. A cup seal as claimed in claim 1, wherein said base side fluid passage grooves are designed to have such a width not to collapse said base side fluid passage grooves when hydraulic fluid flows through said base side fluid passage grooves.

3. A cup seal as claimed in claim 1, wherein said inner lip is formed to be thicker than that of said outer lip.

4. A master cylinder comprising:
   a cylinder body having a cylinder bore,
   a piston which is slidably inserted into said cylinder bore and defines a fluid pressure chamber,
   a communication path which is formed in said cylinder body and communicates with a reservoir,
   a relief port which is formed in said piston, always communicates with said fluid pressure chamber, and allows communication between said communication path and said fluid pressure chamber, and
   a sealing member which is received in a concavity formed in an inner periphery of the cylinder bore of said cylinder body and into which the piston is slidably inserted so as to seal between an inner peripheral surface of said cylinder bore and an outer peripheral surface of said piston,
   wherein communication between said communication path and said relief port is allowed when the master cylinder is inoperative, and the communication between said communication path and said relief port is isolated by movement of said piston when the master cylinder is operative,
   said sealing member is composed of a cup seal as claimed in claim 1, and said base side fluid passage grooves communicate with said communication path.

5. A master cylinder as claimed in claim 4, wherein a space allowing communication between said relief port and said communication path via said base side fluid passage grooves when the master cylinder is inoperative is formed between said cup seal and said relief port.

6. A cup seal as claimed in claim 1, wherein the lip side fluid passage grooves are formed in a portion of the annular inner lip extending axially beyond the annular outer lip.

* * * * *